April 24, 1928.
W. L. PAUL
1,667,130
TRIPPING DEVICE FOR POWER LIFT PLOWS
Filed Dec. 5, 1925
2 Sheets-Sheet 1
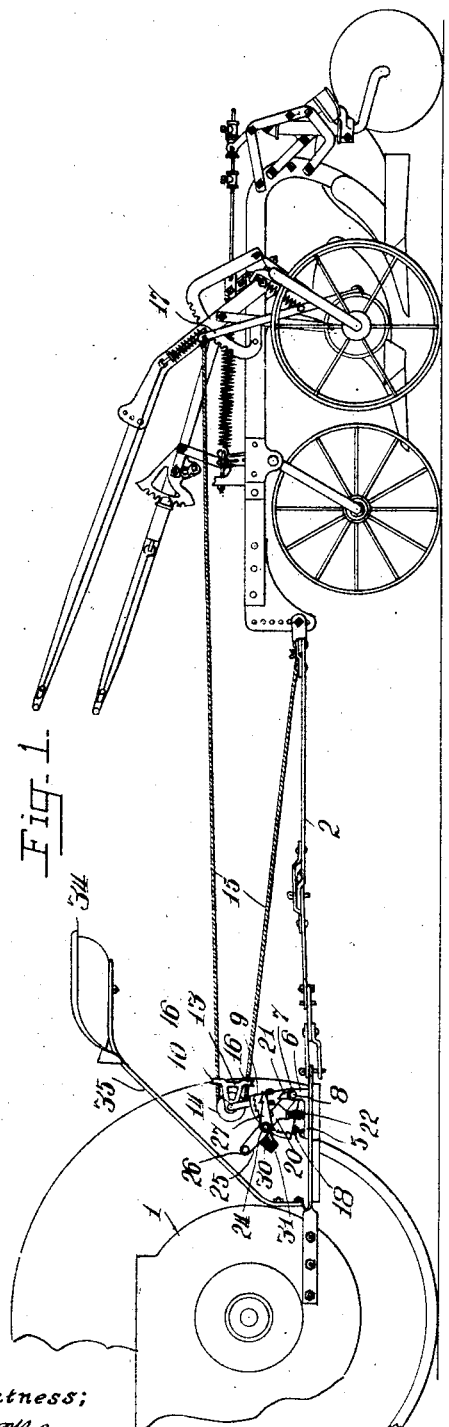
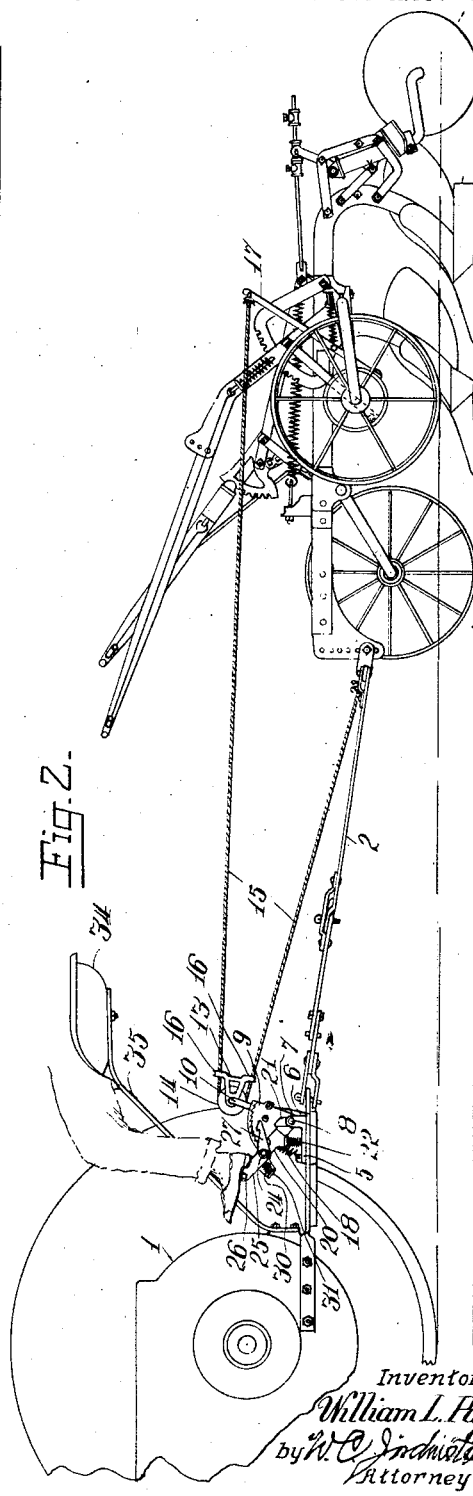
Witness;
E. Wilderson
Inventor;
William L. Paul
by W. C. Inchiatau
Attorney

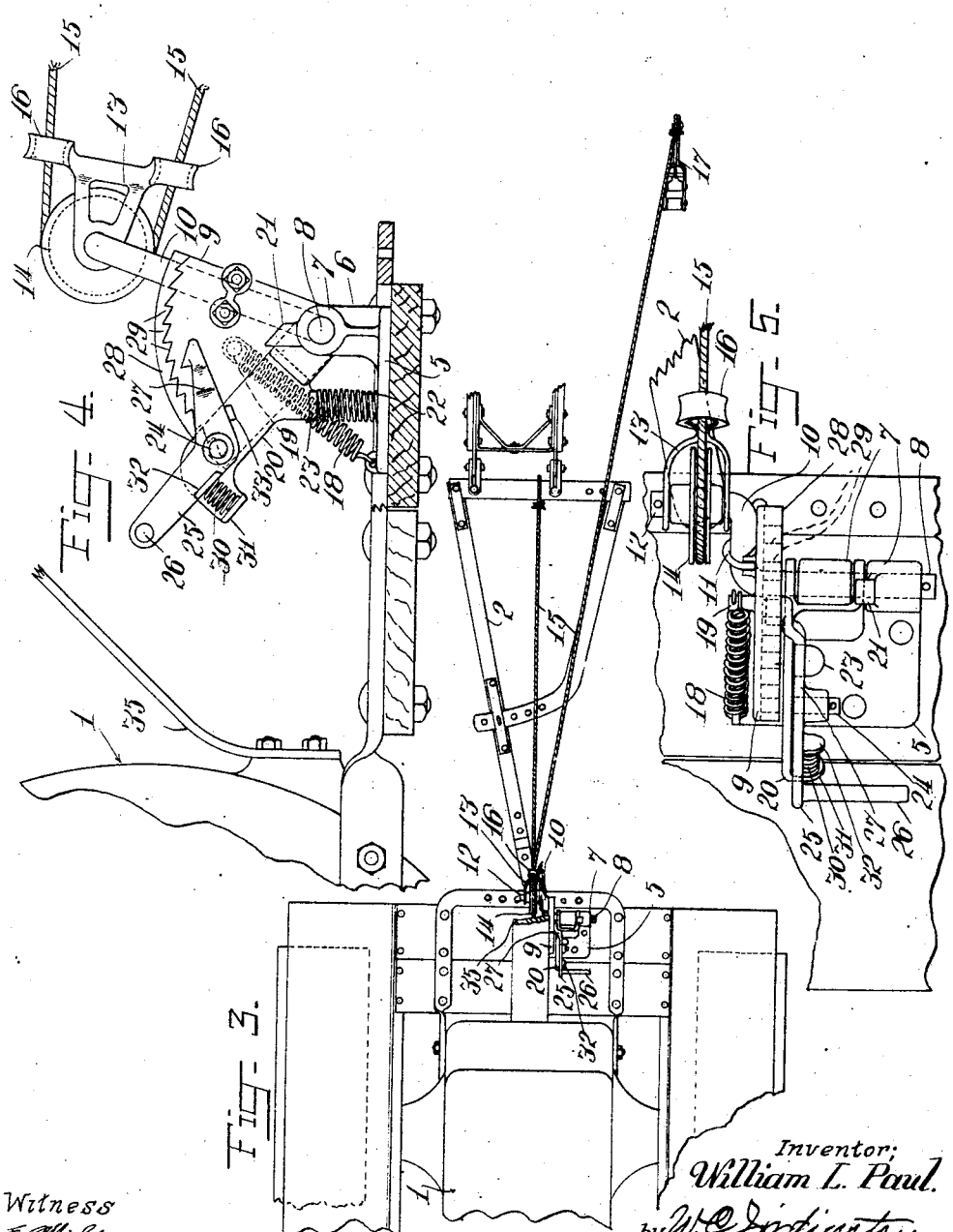

Patented Apr. 24, 1928.

1,667,130

UNITED STATES PATENT OFFICE.

WILLIAM L. PAUL, OF BERKELEY, CALIFORNIA, ASSIGNOR TO DEERE & COMPANY, OF MOLINE, ILLINOIS, A CORPORATION OF ILLINOIS.

TRIPPING DEVICE FOR POWER-LIFT PLOWS.

Application filed December 5, 1925. Serial No. 73,388.

My invention relates to a device adapted to be mounted on a tractor connected with a vehicle to be drawn thereby, said object embodying mechanism which it is desired to control from a tractor and with which my device is to be connected for that purpose. As illustrative of my device and its utility and effectiveness, I have shown and described it applied to the mechanism of a power lift plow, but it is clearly evident that it is equally applicable to any tractor drawn object having mechanical parts which can be tripped into or out of operation at the will of an operator on the tractor.

The invention has for its object to provide a device of the character stated mounted on a tractor convenient to a foot of the operator, and which can be readily actuated without interfering with the attention of the operator in the control or guidance of the tractor.

A further object of my invention is to have the cable, connecting the device with the tripping mechanism of the drawn object, at a constant tension so that the actuation of the tripping mechanism is instantaneously responsive to the operation of the device on the tractor.

Referring to the drawings in which similar numerals indicate identical parts—

Figure 1 is a side elevation of the rear part of a tractor with my device mounted thereon and connected by cable with the tripping mechanism of a power lift plow attached to the tractor and raised out of operation.

Figure 2 is a similar view illustrating the position of the parts of my device after operation, and the plow lowered.

Figure 3 is a plan view of Figure 1 showing enough of the plow to further illustrate the application of my device thereto.

Figure 4 is an enlarged side view of my device and the manner of securing it to a tractor, and Figure 5 is a plan view of Figure 4.

Sufficient of a tractor 1 is shown, to illustrate the application of my invention, and attached thereto, by a draft device 2, is a power lift plow of a well known type. A plate 5 is bolted or otherwise secured to the rear platform of the tractor and, preferably, integral therewith is a vertical arm 6 supporting a bearing 7 in which is journaled an arm 8 of a crank shaft. A sector 9, having its arc concentric with the axis of the arm 8, is rigidly secured to part 10 of the crank shaft, by a U-bolt 11. The part 10 extends vertically to the upper arm 12 of the crank shaft, and pivotally mounted on the latter is a bifurcated member 13 between the arms of which, and on the arm 12, is journaled a pulley 14, having a circumferential groove over which the tripping cable 15 leads and is attached to a stationary part of the draft device as shown, or it may be attached to a part of the plow. The cable 15 is retained upon the pulley 14 by guides 16 on the member 13 and its operative end is attached to the tripping lever 17 of the plow. The cable is at a constant tension by operation of a coiled spring 18 secured to the plate 5 and to a stud 19 on the sector 9.

The bearing 7 has a central transverse slot for reception of an arm of a bifurcated end of a lever 20, the part 8 of the crank shaft passing through both arms of said end sufficiently loose to permit a free rocking movement of the lever 20, the movement of which in one direction is limited by a stop 21 on the bearing 7 against which the lever is held by expansion of a spring 22 in place between the plate 5 and a projection 23 on the lever 20. Pivotally supported intermediate its length on a stud 24, on the lever 20, is a foot lever 25 provided with a treadle 26 at its forward end; rearward of its pivot the foot lever 25 forms a dog 27. The arc of the sector 9 has a flange 28 having a series of teeth 29 on its under side with which the dog 27 is adapted to engage. The dog, however, is held normally out of engagement with the teeth 29 by operation of a coiled spring 30 located between a part 31 on the lever 20 and a similar part 32 on the foot lever 25, the disengaging movement of the dog being limited by a stop 33 on the lever 20.

A seat 34 is mounted on a support 35 secured in such a position on the rear of the tractor that the operator can readily find the treadle 26 with a foot without detracting his attention from control of the machine, irrespective of the direction in which it is moving. Pressure upon the treadle 26 rocks the foot lever 25 until the dog 27 catches on the teeth 29 and, continuing the pressure, the lever 20 and the sector 9 are rocked forwardly, and as a part 10 of the crank shaft is secured to the sector it follows that the pulley 14 is moved forwardly and the consequent pull on the cable 15 rocks the lever 17 to drop the plow to the ground, or if the plow is down, as shown in Figure 2, a similar operation of my device will again rock the lever to release the mechanism, held out of operation by the lever 17, which is actuated by power from a plow wheel to raise the plow. When the foot is raised from the treadle, the spring 31, which has been contracted in the operation of my device, expands, releasing the dog 27 from the teeth 29 of the sector, then the expansion of the spring 22 returns the lever 20 to its normal position in contact with the stop 21. The spring 18, acting against the pull of the cable 15 preserves the tension thereof at all times whether the movement of the two machines is in a direct line or in a change therefrom.

My device is simple in construction and operation and is adaptable for any type of tractor and power lift plow or cultivator drawn thereby. It is readily attachable and detachable, and while I have shown it as operable by a left foot, it is very evident that the parts can be arranged for actuation by either foot.

What I claim is—

1. The combination with a tractor and a vehicle drawn thereby embodying mechanism adapted to be tripped into or out of operation, of tripping means mounted on the tractor having a tensioned connection with said mechanism.

2. The combination with a tractor and a vehicle drawn thereby embodying mechanism adapted to be tripped into or out of operation, of a trip actuating device mounted on the tractor, and tensioned flexible means connecting said device with said mechanism.

3. The combination with a tractor and a vehicle drawn thereby embodying mechanism adapted to be tripped into or out of operation, of a trip actuating device mounted on the tractor, flexible means connecting said device with said mechanism, and means to hold said connecting means under constant tension.

4. The combination with a wheeled plow pivotally attached to a tractor and having self contained mechanism actuable to raise the plow and hold it out of operation, a tripping device operative to release the plow to fall to the ground or to cause said mechanism to raise the plow, of means, mounted on the tractor, having a tensioned connection with said tripping device and operable at will to actuate the same.

5. The combination with a wheeled plow pivotally attached to a tractor and having self contained mechanism actuable to raise the plow and hold it out of operation, a tripping device, including a lever operative to release the plow to fall to the ground or to cause said mechanism to raise the plow, of means, mounted on the tractor, having a tensioned connection with said lever and operable at will to rock the same and actuate the tripping device.

6. The combination with a wheeled plow pivotally attached to a tractor and having self contained power lift mechanism controllable by a tripping device, of means mounted on the tractor flexibly connected with said tripping device to actuate the latter, and means to hold said connection under constant tension.

7. The combination with a wheeled power lift plow having a tripping device and pivotally attached to a tractor, of a rocking mechanism mounted on the tractor, a flexible connection from said mechanism to the tripping device, means operable to rock said mechanism to actuate the tripping device, and means to hold said connection under constant tension.

8. The combination with a wheeled power lift plow having a tripping device and pivotally attached to a tractor, of a rocking mechanism mounted on the tractor, a flexible connection from said mechanism to the tripping device, means operable to rock said mechanism to actuate the tripping device, and means included in said mechanism to hold said connection under constant tension.

9. The combination with a wheeled power lift plow having a tripping device and pivotally attached to a tractor, of a rocking mechanism mounted on the tractor and having a limited rearward movement, a flexible connection from said mechanism to the tripping device, means operable to rock said mechanism forwardly to actuate the tripping device, and means included in said mechanism to hold said connection under constant tension irrespective of the operation of said mechanism.

10. The combination with a wheeled power lift plow pivotally attached to a tractor and having a tripping device, a vertically disposed crank shaft, a bearing on the tractor in which said crank shaft is rockably journaled, a sector rigidly secured to the crank shaft, a flexible connection from said crank shaft to the tripping device, and means journaled on the crank shaft connectible at will with said sector and operable to rock said shaft to actuate the tripping device.

11. The combination with a wheeled power lift plow pivotally attached to a tractor and having a tripping device, a vertically disposed crank shaft, a bearing on the tractor in which said crank shaft is rockably journaled, a pulley on the upper part of the crank shaft, a cable attached to a fixed part of said plow and leading over said pulley to connection with the tripping device, a toothed sector rigidly secured on the crank shaft, a lever pivotally supported on the crank shaft, and a foot lever pivotally mounted intermediate its ends on the first mentioned lever and having a dog at its end adapted to engage with the toothed sector whereby said crank shaft is rockable forwardly to actuate the tripping device.

12. The combination with a wheeled power lift plow having a tripping device and pivotally attached to a tractor, a rockable mechanism mounted on the tractor including a vertically disposed crank shaft, a bearing in which the crank shaft is mounted, a support for said bearing secured on the tractor, a toothed sector rigidly secured on the shaft, a pulley on the upper part of said shaft, a cable leading over the pulley having one end secured to the plow and the opposite end attached to the tripping device, and a coiled spring fastened to said support and to the sector, the contractive force of said spring exerted to hold the cable under constant tension.

WILLIAM L. PAUL.